Patented May 3, 1949

2,469,193

UNITED STATES PATENT OFFICE 2,469,193

PROTEIN FRACTIONATION

Edwin J. Cohn, Cambridge, Mass., assignor to Research Corporation, New York, N. Y., a corporation of New York No Drawing. Original application February 9, 1942, Serial No. 430,075. Divided and this application November 15, 1945, Serial No. 628,975

8 Claims. (Cl. 260—112)

This invention relates to the fractionation of proteins and has for its object the provision of improvements in methods for this purpose and of novel protein products.

A variety of highly useful proteins is contained, for example, in blood. Some of these proteins are found in the red blood cells, others in solution in the plasma or serum. My invention is directed to the separation of proteins from blood or other fluids or animal or vegetable extracts; such as milk, liver extract, corn extract, etc.

The present application is a division of my copending application Ser. No. 430,075, filed February 9, 1942, now U. S. Patent 2,390,074, wherein I have disclosed and claimed processes for fractionating proteins by fractional precipitation. In the present application, processes involving extraction of proteins from solid protein mixtures are claimed.

Successive protein fractions may be precipitated, for example from plasma, by the addition thereto of varying amounts of neutral salts such as phosphates and sulfates, by organic molecules such as ethanol, or some other precipitant such as methanol, butanol, acetone, a suitable member of the glycol series, dioxane, etc., or a mixture of precipitants, such as alcohols and salts or alcohols and ethers. Further fractions may be obtained by variation in the temperature, the hydrogen ion concentration and/or the concentration and nature of the salt which is present.

The plasma may be obtained by first separating the corpuscles from the blood by centrifugation, the fibrinogen being prevented from clotting by the addition of citrates or like agents.

The protein fractions which are precipitated may, for example, comprise largely fibrinogen, or globulin, or albumin, or mixtures thereof, depending on the selection of the combination of factors affecting solubility of the protein.

The fibrinogen separates from the plasma readily when the alcohol or other precipitant is added to it through a capillary or when the plasma is sprayed into the alcohol, precautions being taken to achieve thorough and instantaneous mixing under conditions such that denaturation of the protein shall be at a minimum. The fibrinogen derived from human plasma will clot when the other components to blood coagulation are added to it and can thus be used as a therapeutic agent. Fibrinogen also forms plastics which are thermosetting, the properties of which are described in more detail in Patent No. 2,385,802 to John D. Ferry.

The globulins are more labile than the fibrinogen or the albumins, and certain of the properties of some of these, such as those in normal pooled sera or in convalescent sera, will not in general be retained unless the greatest precautions are taken in their purification. Thus, although one of the globulins, prothrombin, a factor in the coagulation process referred to above, appears to be stable only when precipitated with particular precautions, other globulin components such as those of complement are even more labile.

The albumin proteins are of particular interest, as in the treatment of shock in human beings by intravenous injection of solutions of albumin obtained from the blood of man or of domestic animals such as the cow, sheep, horse, pig, etc.

Serum albumin is isoelectric near pH 4.8. This is true at least for the albumin of human, horse and bovine serum or plasma. Since the pH of the blood is maintained near 7.4, the albumins in the blood are far from the isoelectric point, are combined with more base per gram than are the globulins and therefore would have a greater electrophoretic mobility than the globulins even were they of the same molecular weight. The molecular weight of most albumins is in the neighborhood of 70,000 or approximately half that of most of the globulins, and this also would lead to greater electrophoretic mobilities, as well as to greater osmotic pressures per gram of protein. Although albumins have a greater net charge per gram at neutral reactions than the globulins, as well as a greater number of charged groups in the isoelectric condition, these are arranged with far greater symmetry. As a result, albumins have electric moments smaller than those of the globulins, and, in fact, of most if not all other proteins.

The conditions selected for the fractionation depend upon the solubilities of the various protein components of the system and are determined by the five variables; temperature, pH, ionic strength, concentration of precipitant and concentration of the protein components. The latter factor is of most importance when the concentration of the various proteins in the system is high and diminishes in importance in dilute protein solutions. These effects of protein concentration often protect labile proteins from denaturation. The other four variables are important under all conditions and must always be under control if reproducible separations are to be carried out in protein systems. In sufficiently dilute protein solutions they alone suffice to define the separations. In concentrated solutions the influence of one protein upon another, depending either upon salt formation or upon the interaction between dipolar ions, will have a secondary influence on the separations. In the case of salt formation, either an increase or decrease in solubility may result. In the case of interactions between proteins as dipolar ions near their isoelectric points, the influence of one protein upon another depends upon the electric moments of the proteins and will have an additional influence comparable to that of the ionic strength of the electrolytes.

The conditions for precipitating successive protein fractions are advantageously so selected as to alternate the precipitation of the broadest possible pure fraction with the precipitation of the narrowest possible impure fraction. Application of this principle gives maximum yields of pure protein products.

The volume fractions of ethanol given are those of the mixtures at 25° C. The pH and ionic strength values in ethanol-water mixtures are taken as those which would be obtained if the same concentration of salts were dissolved in pure water at 25° C. This convention is used because of the uncertainty involved in any definition of these quantities in the ethanol-water mixtures. The pH of the desired protein fractions is taken as that measured with a glass electrode for aqueous solutions of about 1% protein concentration.

The separations that I have made are not empirically determined but were chosen with the use of the ultracentrifuge to reveal the size, and of electrophoresis measurements to record the charge, of the proteins, so as to yield products which should approach homogeneity both with respect to size and net charge.

The fibrinogen is first precipitated from the plasma with ethanol at a volume concentration of 10% as the precipitant, at neutral reaction, the temperature being below 0° C. and close to the freezing point of the solution (—3° C.).

The gamma globulins, so-called because of their characteristic electrophoretic mobility, are removed by increasing the ethanol concentration to 25%, the temperature being lowered to —5° C.

The alpha and beta globulins are next separated by bringing the pH to 5.5–6.0 and the alcohol to 40% by volume, the temperature remaining at —5° C.

The albumin remaining in solution under these conditions is largely precipitated from serum or plasma at pH 4.4–4.8 or by lowering the temperature to —15° C. Albumin, both human and bovine, has been prepared by this method and is pure both electrophoretically and in the ultracentrifuge, and there is practically no limit to the amount of this material that can readily be made available.

This method of low temperature alcohol-water fractionation leads to crystallization of bovine albumin, where prior methods have not accomplished this. Such crystallization can be accomplished from plasma which has been contaminated or from haemolyzed plasma, thus making it possible to obtain a pure albumin product even from contaminated sources.

For certain purposes, it may be convenient to separate a variety of proteins from the plasma simultaneously. For example, with 25% ethanol at a temperature of —5° C., the pH remaining unadjusted, fibrinogen and gamma globulins are precipitated together. The protein product so obtained may be used in the manufacture of plastic compositions.

The solubility of each protein in human or in animal plasma will be minimal in the neighborhood of its isoelectric point. The separation of globulins or of casein from water by the addition of sufficient acid or alkali to bring the protein to its isoelectric point illustrates the importance of pH.

Many proteins, notably albumins, are soluble in water, even at their isoelectric points. These may be precipitated either near their isoelectric points or in a pH region not too far distant from their isoelectric points, by salt precipitation or by the addition of an organic precipitant, such as an alcohol, acetone, methanol, butanol, dioxane, a suitable member of the glycol series, etc. The amount of such precipitant necessary will in general be minimal at or near the isoelectric point of the protein. Increases in temperature will have the effect of increasing solubility in the case of proteins uncombined with acid or base near their isoelectric points. Organic solvents will in general have a greater precipitating action on proteins the lower the temperature. Sufficiently concentrated neutral salts such as phosphates and sulfates are often of the reverse effect, the protein solubility decreasing with increasing temperature.

In the case of neutral salts part of the precipitating action is comparable to that of the organic molecule, but part of the salt action gives rise to an increase in the solubility with increase in the concentration of ions (ionic strength). This is the influence of the ionic strength which must be taken into account also as an important variable when organic solvents are used as protein precipitants. Thus in the separation of the albumins from the globulins in plasma the control not only of the concentration and of the organic solvent but of the temperature, the pH and the ionic strength, is essential for the satisfactory separation and for the crystallization of the albumin.

A convenient method for controlling both pH and ionic strength with the same reagent is in the use of buffer solutions. Thus phosphate or acetate buffers of fixed pH and ionic strength have been used for this purpose under a variety of conditions.

The influence of the four variables noted above may be illustrated as follows:

(1) If the alcohol concentration of the plasma solution is brought to 40% by volume at room temperature, the fibrinogen and gamma globulins would be precipitated and in part denatured, but the alpha and beta globulins and the albumin would not be completely precipitated from the plasma.

(2) Decrease in temperature to —5° will very much diminish denaturation, will increase the precipitation of the globulins, but will still not completely precipitate the alpha and beta globulins, whose isoelectric points lie between pH 5 and 6.

(3) If the alcohol concentration is increased, or if the temperature is diminished, or if these two factors are retained constant and the pH is varied by addition of acid or buffer to bring the pH close to 5.5, the precipitation of large parts of the alpha and beta globulins is achieved.

(4) The extent of this precipitation will still depend, however, upon the ionic strength, increase in ionic strength increasing the solubility not only of the globulins but of the albumin.

The amount of this effect will differ, for the globulins and the albumins, and since the globulins are far less soluble in 40% ethanol throughout this pH range an ionic strength of 0.05 has been used to increase the solubility of the albumin sufficiently without increasing the solubility of the globulin to the extent where separation is unsatisfactory.

At this pH, alcohol concentration, ionic strength and temperature, albumin is sufficiently soluble to be almost quantitatively extracted from the precipitate if these proteins are at approximately one quarter of the concentration that they would have had in the original plasma. Thus the albumin concentration is approximately 10 grams/liter, while the globulin soluble under the same conditions never exceeds one half gram/liter and if the separation is carefully carried out it is often lower than 0.10 gram.

As a further example of the inflence of the pH at constant ionic strength, I may then precipitate albumin at constant ionic strength by bringing the pH close to the iso-electric point of the albumin, namely pH 4.7, temperature and alcohol concentration being maintained constant. In order not to expose the albumin to even a local excess of acid, I achieve this recipitation by the addition of an acetate buffer of pH 4.2, the ionic strength being changed from 0.05 to 0.06, while the pH is changed from 5.5 to 4.7.

In adding increasing amounts of alcohol and in varying the temperature for the precipitation of successive protein fractions, the temperature and the percentage of alcohol may be so correlated that the temperature used is just above the freezing point of the solution at the percentage of alcohol present.

The fibrinogen fraction, when redissolved, gives a solution which exhibits double refraction of flow. The fibrinogen consists of molecules which sediment in the ultra-centrifuge in 0.2 molal potassium chloride with a velocity constant of 7.0 to 7.9 $\times$ 10$^{-13}$, migrate in the electrophoresis apparatus at 0° C. in a phosphate buffer solution of ionic strength 0.2 and pH 7.7 with a mobility of 1.8 to 2.3 $\times$ 10$^{-5}$, are rod-shaped, and thus yield very viscous solutions. This product has the property of coagulating to form the clot characteristic of the blood clot in the presence of calcium and prothrombin. Prothrombin is a constituent of another protein fraction of plasma.

One globulin fraction has the property of polymerizing to form aggregates of varying molecular weight. This protein generally has a sedimentation constant in the ultracentrifuge of about $s = 18 \times 10^{-13}$ or $s = 12 \times 10^{-13}$; and its molecules are also rod-shaped and reveal double refraction of flow.

Although the proteins that separate from 15% ethanol when the temperature is shifted from 0° to $-5$° C. and the further precipitate that separates when the ethanol concentration is increased to 20% or 22% ethanol at $-5$° C. consist of a number of different chemical individuals, some of isoelectric point near 7, others of more acid isoelectric points, some near 6, some euglobulin and some pseudoglobulin, the fraction as a whole appears to be very uniform with respect to electrophoretic mobility, as judged in phosphate buffers of ionic strength 0.2 and pH 7.7, the mobility constant having the value of 0.8 to 2.2 $\times$ 10$^{-5}$ cm.$^2$ per second at 0° C. The size of the molecules in this fraction is also constant with the exception of a small amount of the high molecular weight component of sedimentation constant 12 or 18 $\times$ 10$^{-13}$, the rest of the sedimentation constant of the fraction being about 5.9 to 6.7 $\times$ 10$^{-13}$, in 0.2 molal potassium chloride. This fraction soluble in salt solutions but in large part precipitable and separable into its various components by dialysis at varying pH, has been prepared as a copious, white, odorless precipitate. It is less soluble and more viscous than the albumin fractions and of very low electrical net charge.

As contrasted with the protein fractions made up of asymmetric molecules of high viscosity, which are precipitated by the lower concentrations of ethanol mixed with water in neutral solution, the fraction separated at acid reactions (near pH 5) from 40% ethanol at $-5$° C. consists almost completely of albumin of sedimentation constant in 0.2 molal potassium chloride of 4.0 to 4.4 $\times$ 10$^{-13}$ and of electrophoretic mobility at 0° C. in phosphate buffer of ionic strength 0.2 and pH 7.7 of 4.7 to 6.0 $\times$ 10$^{-5}$, the molecules being far more nearly spherical in shape and far more soluble, dissolving readily in water to form a limpid 20% solution of low viscosity.

In an alternate procedure, any desired protein fraction or group of fractions may be obtained by extraction from a solid mixture. Thus I may dry any mixture of these proteins, obtained by any of the procedures previously mentioned. I may then obtain the albumin fraction, for example, from this plasma by extraction under conditions such that only the albumins are soluble, the other proteins being insoluble. This extraction is preferably carried out under conditions such that the utility of the proteins which remain undissolved is not materially impaired. The denaturation, if any, of these undissolved proteins is controlled, so that they may also be subsequently differentially extracted and fractionated. The albumin can then be separated by treating the albumin solution in a manner similar to that described previously. The set of equilibrium conditions at which extraction of any desired fraction from the solid mixture is accomplished may be selected at will by the choice of proper pH, temperature, ionic strength and alcohol concentration, and the solution thus obtained may be treated for the further subdivision of fractions contained therein in the manner previously discussed.

In addition, successive extractions may be made from the dry mixture of proteins, with different solvents and under different temperature, ionic and pH conditions.

Thus, if the alcohol concentration of the plasma solution is brought to 40% by volume at a temperature of $-5$° C., the fibrinogen and gamma globulins will be precipitated without precipitation of albumin, or of all of the alpha and beta globulins whose isoelectric points lie between pH 5 and 6. I may then differentially extract from the precipitate constituting a mixture of fibrinogen and gamma globulins, the gamma globulins by immersing the solid precipitate in ethanol at a volume concentration of 10%, at neutral reaction, the temperature between 0° and $-3$° C., in which case the fibrinogen remains insoluble. The extracted gamma globulins can then be reprecipitated by increasing the ethanol concentration to 25%, the temperature being lowered to $-5$° C.

If on the other hand, the alcohol concentration of the plasma solution is brought to 40% by volume at —5° C. and the pH is varied by addition of acid or buffer to bring the pH close to 5.5 (instead of neutral), the precipitation of large parts of the alpha and beta globulins is achieved. I may then extract, from this precipitate, alpha and beta globulins without extracting gamma globulins with the alcohol at 25% concentration and neutral pH, without change in temperature. At this pH and further lowering the alcohol concentration to 10%, and raising the temperature to —3° or 0° C., I may extract gamma globulins without extracting fibrinogen.

If the ionic strength at pH 5.5 is increased the solubility not only of the globulins but of the albumin is increased. Since the globulins are far less soluble in 40% ethanol throughout this pH range, an ionic strength of 0.05 is used to secure globulin precipitate, substantially free of albumin, as previously disclosed; the albumin being sufficiently soluble to be almost quantitatively extracted from the precipitate.

I may then precipitate the albumin by bringing the pH close to the isoelectric point of the albumin, namely, pH 4.7, temperature and alcohol concentration being maintained constant.

In general, in carrying out the extractions of this invention the variables are controlled within the ranges of a temperature between 0° C. and the freezing point of the solution, pH between 4.4 and 7 and ionic strength below 0.2.

Some protein precipitants, such as alcohol, have a tendency to denature many proteins with which they come in contact, the danger of denaturation increasing with concentration of the alcohol and increase in temperature. For many proteins, it has been found advisable to exercise considerable care in mixing the precipitant with the plasma or other protein solution in order to avoid denaturation of the protein. For these there may be utilized procedures in which the precipitant (e. g., ethanol) is added by diffusion through a semi-permeable membrane. Cellophane is one material which is suitable for use as such a membrane. While maintaining the plasma at low temperature, for example at 0° C., I may suspend it in a sac of cellophane which contains a solution of ethanol and also other ingredients as herein indicated. Assuming that the first protein fraction is to be taken at 10% ethanol, the amount of ethanol in the solution within the semi-permeable membrane will be so calculated with regard to the total volume of liquid both inside and outside the membrane that, when equilibrium is reached, the plasma will contain exactly 10% alcohol.

It is often convenient to precool the alcohol or other reagent, below the temperature of the plasma, so that the temperature of the mixture at equilibrium will be close to the freezing point. This is an additional precaution against denaturation.

Instead of placing the precipitant within the semi-permeable membrane and suspending it in the plasma, the plasma may be confined within the membrane and suspended in a bath of the precipitant. In either case, stirring of the plasma is advisable and is usually necessary, and if the plasma is placed within the membrane, stirring of the bath and recirculation by pumping of the precipitant is also recommended. The purpose of the stirring is to prevent undesirably high concentration of the precipitant at the interface between the plasma and the precipitant.

Procedures involving the use of a semi-permeable membrane are useful not only for the addition of precipitants, but also for the addition of any reagent for modifying or purifying proteins, if such reagent threatens to denature the protein. For example, acid chlorides or acid anhydrides, which combine with the amino and phenolic hydroxyl groups of proteins, iodine which forms iodo proteins, or pyridine or other bases which modify proteins but which tend to cause denaturation, may be added through a semi-permeable membrane in order to avoid denaturation of the proteins.

Suitable large-scale equipment, in which cellophane sheets separate the plasma from the precipitant, will generally be found convenient in production on a commercial scale. The plasma and the precipitant may be circulated through such apparatus on the countercurrent principle.

Instead of cellophane, collodion or sausage casings or the like may be used as the semi-permeable membrane. However, collodion cannot be used when alcohol is the precipitant, since it is soluble in alcohol.

Some proteins, however, will be found to have a much greater resistance to denaturation by alcohol. Albumins, for example, as indicated above, have this property. When the desired product is a protein of this character, it is possible to use procedures which would not be suitable in the production of other and less stable proteins such as, for example, many globulins. The precipitant (e. g. ethanol) may in the case of these more stable proteins, such as albumin and fibrinogen, be added directly to the albumin solution without the use of a semi-permeable membrane. It is, in fact, possible to purify albumin of certain other protein impurities, such as certain globulins, by permitting the globulins to denature in 15 to 20% ethanol at pH 4.8 at temperatures between 0° C. and room temperature, separating the precipitated, denatured protein impurities and leaving the purified albumin in solution. This albumin may be precipitated in crystalline form, under the proper conditions as hereinafter described.

When the stability of the desired protein product permits addition of the alcohol without the use of a semi-permeable membrane, a number of procedures for such addition may be used. Thus fibrinogen has been precipitated from plasma by spraying the plasma into ethanol-water mixtures, or vice versa. A flowing junction has also been employed for this addition, by supplying ethanol-water mixtures through one end of the top of a T-shaped tube, and plasma through the other end of the top. The two solutions are thoroughly mixed in this tube, and pass together down the stem of the T. Alcohol has also been added by forcing ethanol-water mixtures, or in some cases pure ethanol, through a tube of small diameter (e. g., of capillary size or larger) or a sintered glass plate, into the protein solution, with stirring. The precautions against denaturation necessary in any of these additions depend upon the stability of the desired protein product or products. Very labile proteins can be obtained in an undenatured state by careful avoidance of any local excess of alcohol concentration. The rate of denaturation of proteins by local excess of alcohol increases greatly with increasing temperature.

The method of addition of the precipitant to the protein, as well as the nature of the protein, will determine the degree of denaturation as well as the state of subdivision of the precipitate; the latter is of great importance in the processing of proteins on a commercial scale.

The stability of the albumin is such that I find it sufficient to add the buffer in many of the above processes through a capillary with stirring without resorting to the use of a semi-permeable membrane. Since protein precipitates tend to be either very finely divided or sticky, they thus present a problem in obtaining a precipitate which can be satisfactorily collected. Rapid addition of the precipitant, as by the above or similar methods, or even by pouring it into the albumin solution, results in the formation of coarser protein precipitates, which are easier to handle.

Precipitated proteins may be dried by freezing the wet precipitate as with liquid air or solid carbon dioxide, then subjecting the solid frozen mass to a vacuum, whereby the solvent is removed by vaporization and the protein is obtained in the form of a dry powder.

Due to the relatively much greater stability of albumin, however, it has been found possible to dry albumin and other more stable proteins under vacuum at room temperature or by passing dry gases over the wet precipitates, or by removing the water by organic solvents using conventional methods.

The albumin precipitate is a colorless white powder, free of reducing substances. When sufficiently purified it readily dissolves in water, yielding clear solutions even at concentrations as great as 70% protein by volume (70 grams in 100 cc.). In fact, it is apparently completely miscible with water. No precipitate appears in concentrated solutions even after a considerable period of time. Thus 25% solutions have been maintained at 37° C. for over two months without clouding up and at 45° C. for over a month. Human albumin solutions which have been kept for these lengths of time under these conditions have been injected into man as transfusion media without giving any untoward reactions. Aubumin purified in this way appears to be stable for considerable periods of time even in 20% ethanol at room temperature.

Indeed, the albumin is so stable that instead of concentrating it by isoelectric precipitation from 40% ethanol, it may be concentrated by low temperature vacuum distillation even under conditions such that the globulins would be denatured. This unexpected discovery of the stability of the albumin even in ethanol-water mixtures at temperatures above zero degrees C. thus has simplified the methods for its purification and concentration.

Even bovine serum albumin purified by my process, which takes advantage of the stability of albumin being greater than that of the globulins, can be crystallized under certain conditions. I may crystallize the albumin by redissolving the previously precipitated albumin in 40% ethanol at 0° C. and pH 5.5–6.0, using an ionic strength greater than was previously employed so that the solubility of the albumin solution shall be far greater than before. If the ionic strength of acetate buffer is 0.3, I can obtain a 20% solution of the albumin component in 40% ethanol at pH 5.5 at 0° C. If the temperature is —5° C. and the alcohol is maintained at 40% under a pH of 5.5– 6.0, the ionic strength of the acetate buffer must be higher, in the neighborhood of 0.5. Upon standing, crystals separate from such solutions. Were the ionic strength or temperature higher, these would be dissolved. At a lower alcohol concentration (say 15%) at this temperature and pH, part at least of the crystals could be recrystallized if the ionic strength were lower than 0.01. The carbohydrate content of such crystals will be less than 0.1%.

It should be remembered that when the albumins are separated from the globulins at pH 5.5–6.0, temperature —5° C. and alcoholic concentration 40%, the ionic strength is as low as 0.05 and the albumin is present in the mother liquor to an extent less than 1%. By increasing the ionic strength ten-fold, one may produce a far greater increase in the solubility of the proteins, the logarithm of the solubility, rather than the solubility, being a function of the ionic strength in ethanol-water mixtures. It is from these highly concentrated protein solutions that crystallization takes place with the greatest ease.

By successively recrystallizing at lower ionic strengths and lower alcoholic concentrations, I may remove impurities which have different solubilities under these different conditions.

If the same conditions of temperature, pH and alcohol concentration are employed, lower ionic strength should be used in crystallizing human than bovine albumin. Thus I have found that at 40% ethanol at —5° and pH 5.5–6.0, an ionic strength of 0.2 will suffice. If the crystals formed under these conditions be dissolved in a minimal quantity of water and 40% ethanol be added to the solution until turbidity is reached, crystals will again form, crystallization this time taking place at a lower alcoholic concentration and ionic strength. This process I may repeat; each time crystallizing from a lower ionic strength and lower alcoholic concentration.

It is also possible to crystallize from the mother liquors of each of these crystalline masses by adjusting the pH to a slightly more acid reaction or by lowering the temperature. This I also sometimes find convenient, although it is generally more convenient to combine the mother liquors, precipitate the albumin at its iso-electric point by the method previously described, collect the precipitate by filtration or centrifugation, and dissolve the precipitate at the higher ionic strength in 40% ethanol. The process of recrystallization must then be carried out as described above.

The particular set of conditions selected for the precipitation or extraction of any protein fraction will depend upon the protein or proteins desired for the purpose in mind. Those conditions given in the foregoing specifications have been by way of example. As has been indicated, many other sets of conditions are possible, by which different protein fractions may be obtained, in varying degrees of purity.

Having thus described my invention, I claim:

1. The method for the fractionation of proteins which comprises extracting a desired protein from a mixture of proteins in the solid state by immersing said solid mixture in a liquid mixture containing a limited amount of an organic precipitant for protein, and adjusting the temperature, the hydrogen ion concentration, the ionic strength, and the amount of said precipitant so that, of the said mixture of proteins, only the desired protein is soluble in said liquid mixture and the utility of the proteins which remain undissolved is not materially impaired.

2. The method for the fractionation of proteins which comprises extracting a desired group of proteins from a mixture of proteins in the solid state by immersing said solid mixture in a liquid mixture containing a limited amount of an organic precipitant for protein, and adjusting the temperature, the hydrogen ion concentration, the ionic strength, and the amount of said precipitant so that, of the said mixture of proteins, only the desired group of proteins is soluble in said liquid mixture and the proteins which remain undissolved are not materially denatured.

3. The treatment of proteins which comprises removing the liquid from a solution of a mixture of proteins, thus obtaining a mixture of proteins in the solid state, then extracting a selected protein from said solid mixture by imersing said mixture of proteins in a liquid mixture containing a limited amount of an organic precipitant for protein, controlling and maintaining the pH between approximately 4.4 and 7, the temperature between 0° C. and the freezing point of the protein-containing liquid mixture, and the ionic strength between 0.01 and 0.2, so that, of said mixture of proteins, only the selected protein is soluble and the utility of the proteins which remain undissolved is not significantly impaired, removing the extract solution from the undissolved proteins, and precipitating from said extract solution the protein so extracted.

4. In the fractionation of proteins, the process which comprises selectively extracting a desired protein from a mixture of proteins in the solid state, by immersing said mixture of proteins in a liquid mixture containing a limited amount of an organic precipitant for protein, said protein-containing liquid mixture having a pH between 4.4 and 7, an ionic strength between 0.01 and 0.2 and a temperature between 0° C. and the freezing point of the protein-containing liquid mixture, the amount of precipitant, the pH, the ionic strength and the temperature of the liquid mixture being such that, of the various proteins contained in said solid protein mixture, only the desired protein is soluble in said liquid mixture, and removing the extract solution from the undissolved proteins.

5. The treatment of proteins which comprises removing the liquid from a solution of a mixture of proteins, thus obtaining a mixture of proteins in the solid state, then extracting a selected protein from said solid mixture by immersing said mixture of proteins in a liquid mixture which contains between 10% and 40% of an organic precipitant for protein, at a temperature between 0° and −15° C., a pH between 4.4 and 7, and an ionic strength between 0.01 and 0.2, so that, of the said mixture of proteins, only the selected protein is soluble in said liquid mixture and the utility of the proteins which remain undissolved is not materially impaired.

6. The treatment of proteins which comprises extracting a desired protein from a mixture of proteins in the solid state under conditions such that the denaturation of the proteins which remain undissolved is controlled, by immersing said mixture of proteins in a liquid mixture containing, in amount between 10% and 40%, an organic precipitant for protein, at a temperature between 0° and −15° C., and pH being between 4.4 and 7 and the ionic strength being between 0.01 and 0.2, so that, of the said mixture of proteins, only the desired protein is soluble in said liquid mixture.

7. The treatment of proteins which comprises extracting a selected protein from a solid mixture of proteins under conditions such that the proteins which remain undissolved are not materially denatured, by immersing said solid mixture in a liquid mixture containing a limited amount of an organic precipitant for protein, at a pH between 4.4 and 7 and an ionic strength between 0.01 and 0.2, at a temperature between approximately 0° C. and the freezing point of the protein-containing liquid mixture, the organic precipitant for protein being present in amount sufficient to prevent solution of other proteins than the said selected protein under the pH, ionic strength and temperature conditions existing in the protein-containing mixture.

8. The method for the fractionation of proteins which comprises extracting a desired group of proteins from a mixture of proteins in the solid state by immersing said solid mixture in a liquid mixture containing a limited amount of an organic precipitant for protein, adjusting the temperature, the hydrogen ion concentration, the ionic strength, and the amount of said precipitant so that, of the said mixture of proteins, only the desired group of proteins is soluble in said liquid mixture, then precipitating a selected protein from the resulting mixture by bringing the pH of said resulting mixture to approximately the iso-electric point of said selected protein, the ionic strength to between 0.01 and 0.2 and the temperature to between approximately 0° C. and the freezing point of the protein-containing mixture, the organic precipitant being present in the liquid mixture in amount sufficient to cause precipitation of the selected protein under the existing pH, ionic strength and temperature conditions.

EDWIN J. COHN.

REFERENCES CITED

The following references are of record in the file of this patent:

UNITED STATES PATENTS

| Number | Name | Date |
| --- | --- | --- |
| 2,390,074 | Cohn | Dec. 4, 1945 |